Sept. 8, 1931.  M. G. MARTIN ET AL  1,822,446
MATERIAL MEASURING AND HANDLING APPARATUS
Filed Sept. 13, 1928  2 Sheets-Sheet 1
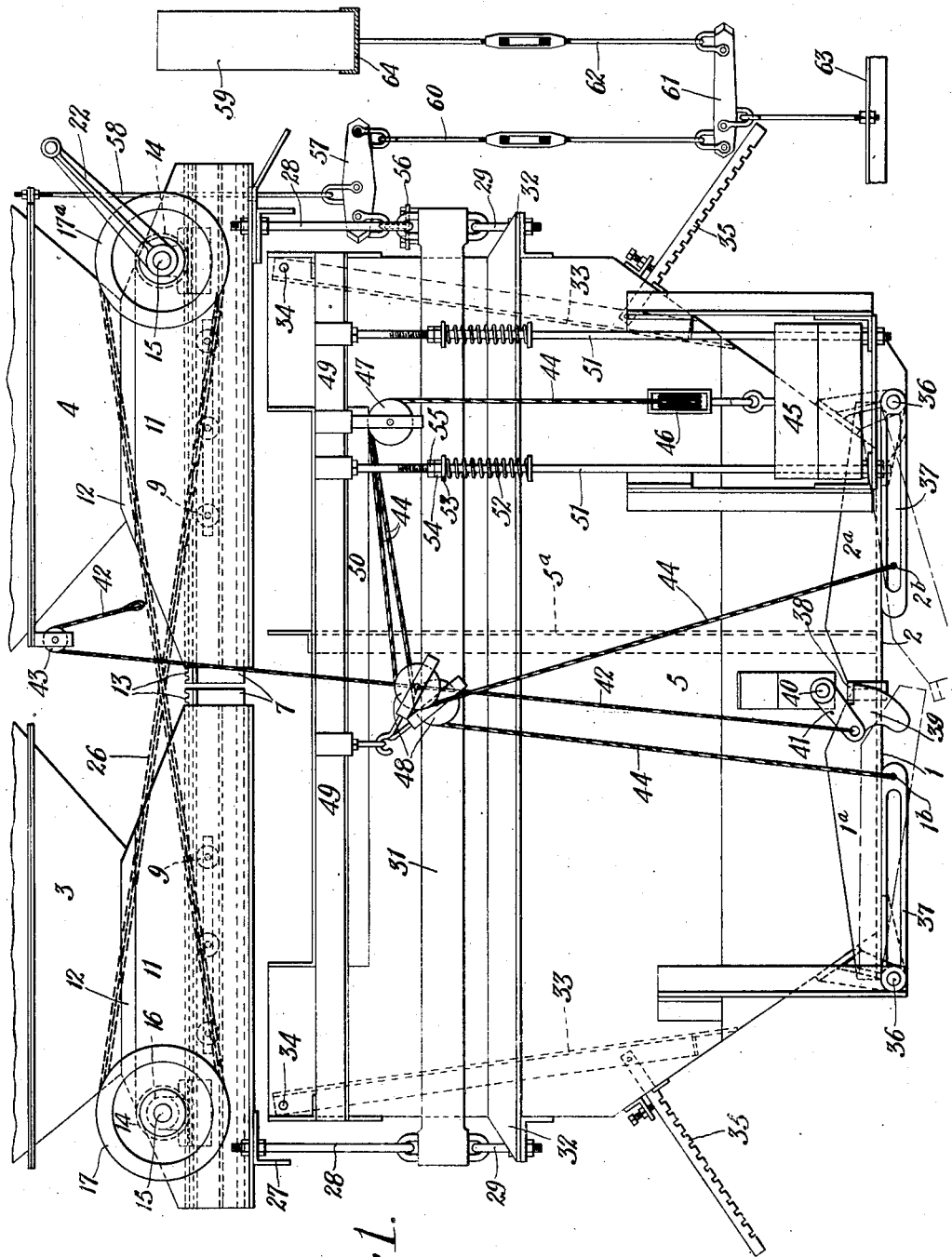
INVENTORS
Marion G. Martin and
Fred Voelker, Jr.
ATTORNEYS
Synnestvedt + Lechner Sept. 8, 1931.  M. G. MARTIN ET AL  1,822,446
MATERIAL MEASURING AND HANDLING APPARATUS
Filed Sept. 13, 1928   2 Sheets-Sheet 2
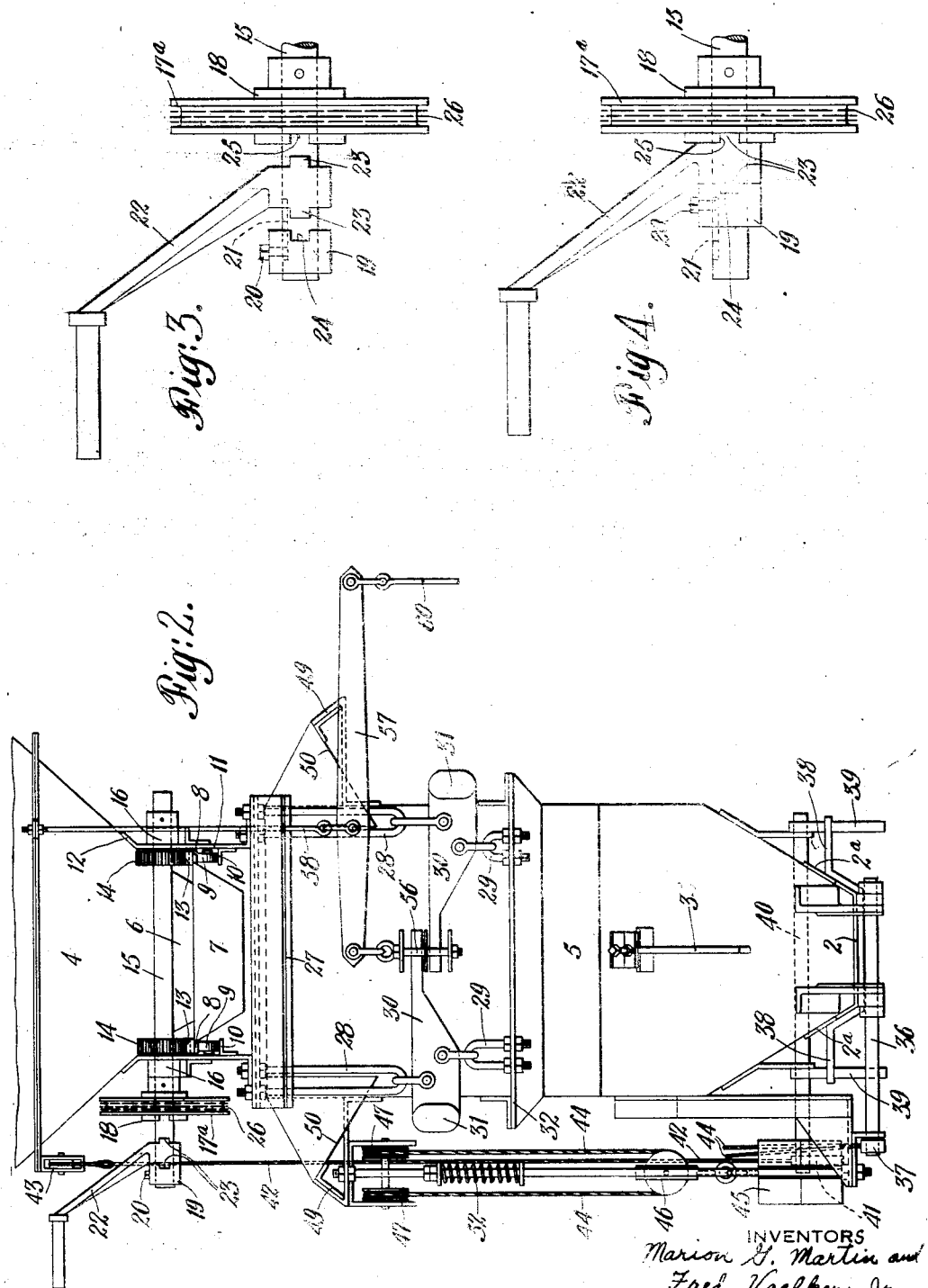

Patented Sept. 8, 1931

1,822,446

UNITED STATES PATENT OFFICE

MARION G. MARTIN, OF ASPINWALL, AND FRED VOELKER, JR., OF PITTSBURGH, PENNSYLVANIA, ASSIGNORS TO BLAW-KNOX COMPANY, A CORPORATION OF NEW JERSEY

MATERIAL MEASURING AND HANDLING APPARATUS

Application filed September 13, 1928. Serial No. 305,718.

This invention relates to material measuring and handling apparatus, and particularly to batchers or mechanism for the measuring and handling of aggregates for making concrete, such as sand, stone, cement, and the like.

One of the primary objects of the invention is the simplification of the construction, assemblage, and operation of apparatus of the character specified.

Another object of the invention is to improve the flexibility of such apparatus, especially as regards its capability for use either for weight measurement, for volume measurement, or for a combination of the two, and to reduce the possibility of inaccuracy of measurement.

A further object of the invention is to improve the feeding, measuring, and discharging of the materials, by the provision of certain novel features of construction, which at the same time speed up the measuring and handling operations and prolong the useful life of the mechanism.

Still another object of the invention is to so co-ordinate the several parts of the mechanism, and particularly the control devices thereof, as to bring the whole operation thereof within the observation and control of an operator located to one side thereof; and, in addition, to make readily possible the alteration of the whole structure for operation from the opposite side.

How these objects and advantages, together with such others as are incident to the invention, or which will occur to those skilled in the art, are obtained, will be evident from the following description, taken together with the accompanying drawings, in which:

Fig. 1 is a side elevational view, partly diagrammatic, of a material measuring and handling device embodying our invention.

Fig. 2 is an end elevation, taken from the right of Fig. 1, with portions of the weighing mechanism omitted.

Fig. 3 is an enlarged view of certain details of the control mechanism of Figs. 1 and 2, and Fig. 4 is a view similar to Fig. 3 but showing the parts thereof in a different relation.

By reference now to Figs. 1 and 2, it will be seen that we have illustrated the lower portion 3 of an overhead stone supply bin and the lower portion 4 of a similar overhead sand supply bin, such bins ordinarily being mounted on legs or supports at sufficient height to permit the passage of a truck, conveyor, or concrete mixer below the bottom of the measuring device 5.

Below the throat 6 (see Fig. 2) of each supply bin is mounted a control device, such as a reciprocable trough-like gate 7, which has flanges 8 at its sides resting on rollers 9 riding on the track 10, said track here being in the form of an angle member mounted on the depending sheet 11 secured at 12 to the bin. Each flange 8 of each gate carries a rack 13 (see Figs. 1 and 2), with which is engaged a pinion 14 fixed on shaft 15, said shaft being journaled in bearings 16 mounted on the sides of said depending supports 11.

On one shaft 15 (the one at the left in Fig. 1) is fixedly mounted a wheel or pulley 17, while a similar pulley 17a is floatingly mounted on the other shaft 15 by means of a collar-like hub 18 (see Figs. 1 to 4). On the said latter shaft 15 is a collar 19 having a bolt or set screw 20 engaging a spline 21. A handle or crank 22, loosely mounted on said shaft 15 between the hub 18 and the collar 19, is provided with lugs or teeth 23, one of which, upon movement of the crank outwardly on the shaft, engages recess 24 on collar 19 for the purpose of rotating said shaft to move the gate 7 of the sand bin 4, while the other of which, upon movement of the crank inwardly, engages recess 25 on pulley hub 18, to operate the gate of the stone bin 3 through the intermediation of pulleys 17a and 17 and chain 26. By moving collar 19 to the position shown in Fig. 4 the crank can be made to operate both gates simultaneously, which hastens operations when measuring by volume.

The measuring hopper 5—suspended below the structure just described, by means of the cross-braces 27, links 28, 29, transverse and longitudinal scale levers 30 and 31, and flange structure 32—is divided by a partition 5a into two compartments, one for receiving stone from bin 3, and the other for receiving sand from bin 4. These two compartments are made variable, as to effective volume, by means of the baffles 33, pivoted at 34 and connected to notched adjusting rods 35. The bottom of the hopper 5 is closed by a pair of doors 1, 2 having trough-like sides 1a, 2a, so that, when they swing downwardly on their pivots, (as seen in dot and dash lines in Fig. 1) they form centrally directed chutes to guide the discharged materials to a common subjacent point and to intermingle the two materials as they fall.

The doors are each fixed on a pivoted transverse rod 36, each of said rods carrying at its outer end a fixed operating arm 37; and door 2, which overlaps door 1 (as shown in Fig. 1), carries on each side a bracket or arm 38 adapted to engage a latch 39. The two latches are fixed on the pivoted transverse rod 40, which carries at one end a lever or arm 41, to which the door trip-line 42 is attached. Said trip-line is preferably carried over a pulley 43 to a point which is conveniently located with respect to the operator who stands in a position to manipulate the gate-control crank 22. The overlapping of the doors obviates the necessity for a separate set of latches for each.

The two ends of a cable or line 44 are respectively attached to the two door operating arms 37, and an adjustable counterweight 45, hangs, by a block 46, in the bight of the line, the two sides of the line running over suitable pulleys or sheaves 47, 48. These sheaves, as here shown, are mounted on a bracket-like structure 49 which forms a support beneath the flared edge or lip 50 of the hopper, such lip providing a convenient means for removing excess material from either compartment of the hopper, if that should be necessary, while, at the same time, protecting the sheaves and other subjacent parts from sand or other grit. The lips or shelves 50, as shown, while permitting easy withdrawal of material, do not cause loss or overflow of material during measurement, since they are so located and set at such an angle that the normal angle of rest at the surface of the materials, when the hopper is filled, will fall within the outer edges of said lips.

It will be seen that the points of attachment, (1b and 2b) of the cable ends on the arms 37, are at different distances from the pivot points of said arms, so that the weight 45, in closing the doors, will automatically first close door 1 and then door 2, the latter overlapping the former. The weight 45 is guided in its vertical movement by the rods 51 which are fixed at both ends to structure secured to the hopper 5.

On each of said rods 51 is a spring 52, washer 53 and nut 54, secured together, as by welding, said nut being threaded on rod 51 for altering the location of the spring. A lock nut 55 may also be provided. This construction forms a means of cushioning the movement of the doors upon discharge, as well as a means of adjusting the travel or degree of opening thereof. It will be observed that this cushion, with its means of adjustment, is located in a convenient position with respect to the operator. So also is the weight itself, because of the fact that it is sometimes desirable, for example when the sand is very damp and tends to stick on the surfaces of the doors, or tends to run out slower than the stone, to adjust the weight to an amount slightly less than sufficient to fully close the doors, in order that the discharge of the materials may be completed, after which the operator may insure complete closure of the doors by pressing his foot down on the counterweight. For the same reason it is desirable to have door 2 (which closes last) located beneath the sand compartment of the hopper. When the sand measured is dry the weight may be adjusted to close the doors completely without any assistance from the operator.

While the hopper 5 may be fixedly hung from the cross members 27 of the bin structure in cases where the mechanism is to be used for volume-measurement only, we have shown it suspended through the intermediation of links and scale levers, so that measurement may be had by weight also, or by a combination of volume and weight. To this end the levers 30, hereinbefore mentiond, extend into a combining yoke 56 which is supported on the end of a lever 57, said lever being fulcrumed on any suitable fixed support such as the rod 58 hanging from the bin above. The other end of lever 57 is connected with the mechanism in the scale-box (diagrammatically indicated at 59) through the intermediation of a suitable link and lever structure 60, 61, 62. It will be understood that the member 63 (Fig. 1) is fixed, being conveniently a part of the platform structure on which the operator stands, and the member 64 is a fixed support or bracket for the scale-box located preferably within easy observation and reach of the operator.

In general, it will be seen: that our invention provides for the ready operation and control of the entire batcher from a point on one side thereof, including the operations of delivering the sand and the stone to the hopper, measuring and/or weighing them, reading or adjusting the scales, removing excess materials if necessary, discharging the measured materials, and adjusting the counterweight and the discharge shock absorbing means; that the construction provides for the ready assemblage and shipment of the whole structure, including bins and hopper, as a unit; that the device is so constructed as to permit of the transfer of the several controls, or certain ones only, at will, to the other side of the hopper, after the mechansim is set up at the scene of operations; and that the device may be used, in its entirety, for measurement by volume only, by weight only, or by both volume and weight, and further, if desired, the scale levers 30, 31, etc. may be entirely removed and the hopper be supported directly by fixed links extending between flanges 32 and supports 27.

Certain of the details of the construction as a whole effect other advantages, as follows:

The double, chute-like, doors direct the material to a central point, and minimize spilling when the materials are dumped into a subjacent truck, mixer, or conveyor.

The mounting of the counterweight, cable and sheaves, entirely on the hopper eliminates inaccuracies in weighing which otherwise would result from the friction normally present in the operation of these parts.

The crank, pulley, and chain, arrangement, with the adjustable collar 19, provides for the ready operation of either delivery gate separately, or both together.

What we claim is:—

1. Material measuring and handling apparatus including a plurality of material supply devices, a gate for discharging material from each of them, an operating device, and means for clutching said device to any of the gates, together with a subjacent measuring hopper having a separate discharge means and operating device, said operating devices being located at the same side of the apparatus.

2. In combination, a material supplying means, a subjacent measuring hopper, means for controlling the delivery of material from the former to the latter, gate means for discharging the measured material from the hopper, the top of said hopper being in juxtaposition to said controlling means, and a flared edge at the top of the hopper whereby access may be had thereto for removing excess material before operation of the discharging gate means, the controlling and gate means being positioned adjacent said flared edge for ready control over them all from one position.

3. In combination, a material supplying means, a subjacent measuring hopper, means for controlling the delivery of material from the former to the latter, gate means for discharging the measured material from the hopper, the top of said hopper being in juxtaposition to said controlling means, and a flared edge at the top of the hopper whereby access may be had thereto for removing excess material before operation of the discharging gate means, together with a gate counterweight device mounted on the hopper.

4. In combination, a material supplying means, a subjacent measuring hopper, means for controlling the delivery of material from the former to the latter, gate means for discharging the measured material from the hopper, the top of said hopper being in juxtaposition to said controlling means, and a flared edge at the top of the hopper whereby access may be had thereto for removing excess material before operation of the discharging gate means, together with a gate counterweight device having an operating cable and pulley means therefor mounted beneath the flared edge.

5. In apparatus of the character described, a scale-supported material measuring hopper having a pair of pivoted discharging doors, one overlapping the other, and means constructed to close them serially upon discharge of the material, said means being mounted on the hopper.

6. In apparatus of the character described, a scale-supported material measuring hopper having a pair of pivoted discharging doors, one overlapping the other, and means supported from the hopper constructed to close the doors serially upon discharge of the material, the free ends of said doors being formed as troughs directed toward each other.

7. In apparatus of the character described, a material measuring hopper having a pair of pivoted discharging doors, one overlapping the other, and means constructed to close them serially upon discharge of the material, said means including a counterweight, cable connections, and sheaves, all mounted on the hopper.

8. In apparatus of the character described, a material measuring hopper having a pair of pivoted discharging doors, one overlapping the other, and means constructed to close them serially upon discharge of the material, said means including a counterweight, cable connections, and sheaves, all mounted on the hopper, together with a weighing scales operatively connected to the hopper.

9. In apparatus of the character described, a material measuring hopper having a pair of pivoted discharging doors, one overlapping the other, and means constructed to close them serially upon discharge of the material comprising a line, the ends of which are operatively connected to the respective doors, sheaves over which the line passes, and a weight suspended in the bight of the line.

10. In apparatus of the character described a material measuring hopper having a pair of pivoted discharging doors, one overlapping the other, and means constructed to close them serially upon discharge of the material, including an operating arm connected to each door, cable means connected to said arms, and a weight acting on the cable means, the effective length of one arm differing from the effective length of the other.

11. In combination with a material supply bin and weighing scale mechanism, a hopper supported below said bin on said scale mechanism, a plurality of discharge doors on said hopper, and means constructed to close said doors in sequence, after discharge.

12. In combination with a material supply bin and weighing scale mechanism, a hopper supported below said bin on said scale mechanism, a plurality of discharge doors on said hopper, and means constructed to close said doors in sequence, after discharge, said means being supported by said hopper.

13. In material measuring and handling apparatus, a measuring and discharging hopper having compartments one of which is for sand, means for controlling the supply of materials to said compartments for measurement, a plurality of discharge doors on the hopper one of which is beneath the sand compartment, and door closing means constructed to close the doors in sequence and closing the sand discharge door last.

14. In material measuring and handling apparatus, a measuring and discharging hopper having compartments one of which is for sand, means for controlling the supply of materials to said compartments for measurement, a plurality of discharge doors on the hopper one of which is beneath the sand compartment, and door closing means constructed to close the doors in sequence and closing the sand discharge door last, said door overlapping the next adjacent door when closed.

15. In material measuring and handling apparatus, a measuring and discharging hopper having compartments one of which is for sand, means for controlling the supply of materials to said compartments for measurement, a plurality of discharge doors on the hopper one of which is beneath the sand compartment, and door closing means constructed to close the doors in sequence and closing the sand discharge door last, said door overlapping the next adjacent door when closed, together with latch means for said overlapping door.

16. In material measuring and handling apparatus, a measuring and discharging hopper having compartments one of which is for sand, means for controlling the supply of materials to said compartments for measurement, a plurality of discharge doors on the hopper one of which is beneath the sand compartment, and door closing means constructed to close the doors in sequence and closing the sand discharge door last, said door overlapping the next adjacent door when closed, together with latch means for said overlapping door and latch control means, the supply controlling means and the latch control means being located on the same side of the apparatus.

17. In material measuring and handling apparatus, a measuring and discharging hopper having compartments one of which is for sand, means for controlling the supply of materials to said compartments for measurement, a plurality of discharge doors on the hopper one of which is beneath the sand compartment, and door closing means constructed to close the doors in sequence and closing the sand discharge door last, said door overlapping the next adjacent door when closed, together with latch means for said overlapping door, latch control means, and door-movement controlling means all located on one side of the apparatus.

18. In apparatus of the character described, a material measuring hopper divided into a plurality of compartments for aggregates of different fineness and having a plurality of movable discharging doors, each beneath one of the compartments, the one beneath the compartment for finer aggregate overlapping the one beneath an adjacent compartment, and means constructed to close said doors serially upon discharge of the material.

19. In apparatus of the character described, a material measuring hopper divided into a plurality of compartments for aggregates of different fineness and having a plurality of movable discharging doors, each beneath one of the compartments, the one beneath the compartment for finer aggregate overlapping the one beneath an adjacent compartment, and means constructed to close said doors serially upon discharge of the material, said means being mounted on the hopper.

In testimony whereof we have hereunto signed our names.

MARION G. MARTIN.
FRED VOELKER, Jr.